(12) United States Patent
Smith, Jr. et al.

(10) Patent No.: US 8,267,466 B1
(45) Date of Patent: Sep. 18, 2012

(54) TRUCK BED DESIGN FOR AUTOMOTIVE AND EQUIPMENT DELIVERY

(75) Inventors: Raymond E. Smith, Jr., Lake Bluff, IL (US); Joseph D. Simons, Oconomowoc, WI (US); John E. Simons, Milwaukee, WI (US)

(73) Assignee: Versatran, Inc., Watertown, WI (US)

( * ) Notice: Subject to any disclaimer, the term of this patent is extended or adjusted under 35 U.S.C. 154(b) by 0 days.

(21) Appl. No.: 13/223,512

(22) Filed: Sep. 1, 2011

(51) Int. Cl.
*B62D 25/20* (2006.01)

(52) U.S. Cl. .................................... 296/184.1

(58) Field of Classification Search ............... 296/184.1, 296/37.6, 203.01, 204, 187.01, 100.09, 183.1; 414/471, 401; 14/71.3; 180/89.1
See application file for complete search history.

(56) References Cited

U.S. PATENT DOCUMENTS

| | | | | | |
|---|---|---|---|---|---|
| 4,302,022 | A | * | 11/1981 | Schoeffler et al. | 280/43.19 |
| 4,556,357 | A | * | 12/1985 | Landoll et al. | 414/469 |
| 4,958,978 | A | * | 9/1990 | Shedleski | 414/483 |
| 5,051,053 | A | * | 9/1991 | Groeneweg | 414/483 |
| 5,234,308 | A | * | 8/1993 | Mann | 414/480 |
| 5,263,807 | A | * | 11/1993 | Pijanowski | 414/480 |
| 5,397,208 | A | * | 3/1995 | Siebenga | 414/111 |
| 5,688,099 | A | * | 11/1997 | Fischer | 414/537 |
| 5,887,880 | A | * | 3/1999 | Mullican et al. | 280/43.18 |
| 5,924,836 | A | * | 7/1999 | Kelly | 414/482 |
| 6,149,369 | A | * | 11/2000 | Reed | 414/480 |
| 6,276,890 | B1 | * | 8/2001 | Pratt | 414/477 |
| 6,698,996 | B2 | | 3/2004 | Smith, Jr. | |
| 6,814,397 | B2 | * | 11/2004 | Henderson et al. | 296/184.1 |
| 7,063,494 | B2 | * | 6/2006 | Smith, Jr. | 414/471 |
| 7,111,897 | B2 | * | 9/2006 | Ingram et al. | 296/168 |
| 7,264,305 | B2 | * | 9/2007 | Kuriakose | 296/193.07 |
| 7,503,742 | B2 | * | 3/2009 | Smith, Jr. | 414/471 |
| 7,651,312 | B2 | * | 1/2010 | Armour et al. | 414/476 |
| 7,823,958 | B2 | * | 11/2010 | Sato | 296/183.1 |
| 8,118,345 | B1 | * | 2/2012 | Hootman | 296/184.1 |
| 2002/0081182 | A1 | * | 6/2002 | Harris | 414/477 |
| 2006/0099061 | A1 | * | 5/2006 | Smith et al. | 414/537 |
| 2006/0284393 | A1 | * | 12/2006 | Smith et al. | 280/86.751 |
| 2010/0237654 | A1 | * | 9/2010 | Pannone et al. | 296/184.1 |
| 2011/0187178 | A1 | * | 8/2011 | King | 298/17 R |

\* cited by examiner

*Primary Examiner* — Kiran B Patel
(74) *Attorney, Agent, or Firm* — Donald J. Ersler

(57) ABSTRACT

An improved truck bed design for automotive and equipment delivery preferably includes at least one front section, a rear section and a front pan. A front of the rear section is preferably pivotally retained on a rear of the front section. The front pan is attached to a front of the front section. The front section includes a plurality of front lengthwise support members, at least one cross member and two front deck plates. The rear section includes two first rear deck plates, a second rear deck plate, a plurality of rear lengthwise support members and at least two improved air bag retention systems. Each improved air bag retention system includes an air bag, an air bag bracket and a base bracket. The front pan is formed from a single piece of material, which includes a base member, a first side member and a second side member.

12 Claims, 10 Drawing Sheets

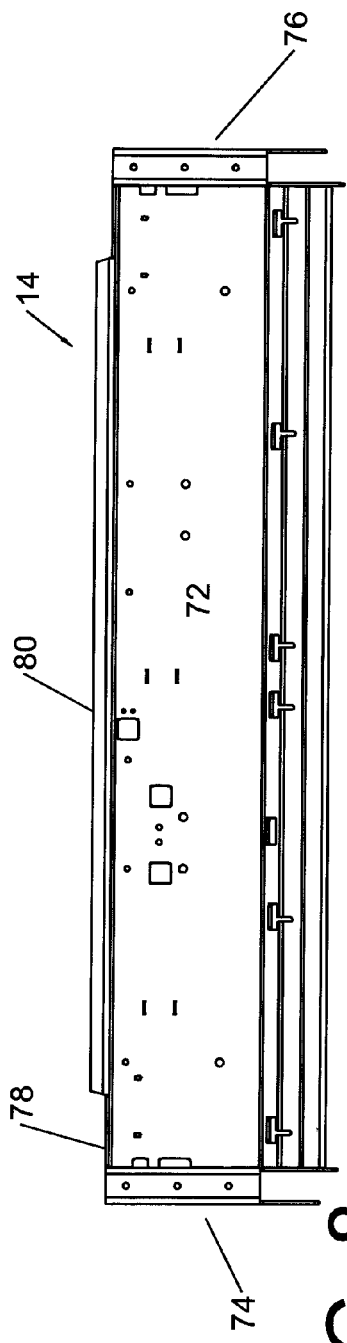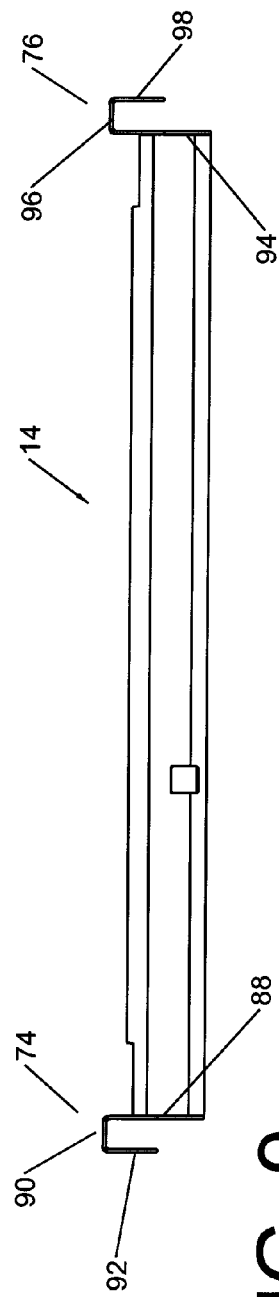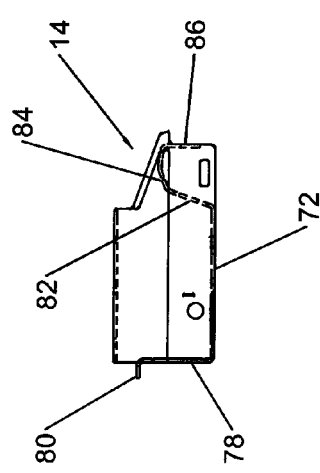
FIG. 8
FIG. 9
FIG. 10

TRUCK BED DESIGN FOR AUTOMOTIVE AND EQUIPMENT DELIVERY

BACKGROUND OF THE INVENTION

1. Field of the Invention

The present invention relates generally to truck beds and more specifically to an improved truck bed design for automotive and equipment delivery, which includes fewer manufactured parts.

2. Discussion of the Prior Art

U.S. Pat. No. 6,698,996 to Smith, Jr. discloses a truck bed design for automotive and equipment delivery. U.S. Pat. No. 7,063,494 to Smith, Jr. discloses a truck bed design for automotive and equipment delivery. U.S. Pat. No. 7,503,742 to Smith, Jr. discloses a vehicle and equipment transport vehicle. U.S. Pat. Nos. 6,698,996, 7,063,494 and 7,503,742 are hereby incorporated into this patent application by reference in their entirety.

Accordingly, there is a clearly felt need in the art for an improved truck bed design for automotive and equipment delivery, which includes fewer manufactured parts with the result of a reduced manufacturing cost; a reduced height between a top of the truck bed and the ground; a reduced bridge clearance; lowered center of gravity; and more convenient loading.

SUMMARY OF THE INVENTION

The present invention provides an improved truck bed design for automotive and equipment delivery, which includes a reduced height from a top of the truck bed to the ground. The improved truck bed design for automotive and equipment delivery (improved truck bed design) preferably includes at least one front section, a rear section and a front pan. The front section is attached to a frame. A front of the rear section is preferably pivotally retained on a rear of the front section. The front pan is attached to a front of the front section. The front section includes a plurality of front lengthwise support members, at least one cross member and two front deck plates. A height of the front lengthwise support members is reduced by including the at least one cross member and by increasing a thickness of the two deck plates. The reduced height of the plurality of front lengthwise support members allows the bed to be closer to the ground than that of the prior art front section. Increasing a thickness of the two deck plates provides enough strength for tie-down openings to eliminate extra tie-down strengthening hardware. Eliminating the tie-down strengthening hardware reduces parts costs and eliminates man hours required to attach the strengthening hardware. Outer side edges of the two deck plates are preferably bent into a U-shaped cross section. The tie-down openings are formed through a top of each deck plate and a lower leg portion of the U-shaped cross section.

The rear section includes two first rear deck plates, a second rear deck plate, a plurality of rear lengthwise support members and at least two improved air bag retention systems. Each improved air bag retention system includes an air bag, an air bag bracket and a base bracket. The air bag bracket is preferably fabricated from a single piece of material. The air bag bracket includes a base plate, a bolt flange and a tongue flange. The tongue flange includes a pair of tongue projections extending from the tongue flange. The base bracket includes a base bolt flange.

Each rear deck plate includes a down-turned flange. A pair of tongue slots are formed in the down-turned flange. The air bag is attached to the air bag bracket. The base bracket is attached to a bottom of one of the first rear deck plates. The pair of tongue projections are inserted through the pair of tongue slots. At least two bolts secure the bolt flange to the base bolt flange.

The front pan is fabricated from a single sheet of material. The front pan includes a base member, a first side member and a second side member. The first side member extends from a first side of the base member and the second side member extends from a second side of the base member. A front end of the base member is bent upward to form a front wall. A top of the front wall is bent down to form a front flange. A rear end of the base member is bent upward to form an inner rear wall, a rear top surface and an outer rear wall. The inner rear wall extends upward from the base member. The rear top surface extends from a top of the inner rear wall. The outer rear wall extends downward from the rear top surface.

The first side member is bent upward against the first side of the base member to form a first inner wall. The first inner wall is bent down to form a first top surface. The first top surface is bent downward to form a first outer wall. The second side member is bent upward against the second side of the base member to form a second inner wall. The second inner wall is bent down to form a second top surface. The second top surface is bent downward to form a second outer wall.

Accordingly, it is an object of the present invention to provide an improved truck bed design, which includes fewer manufactured parts with the result of a reduced manufacturing cost.

It is another object of the present invention to provide an improved truck bed design, which includes thicker front deck plates for reducing the number of parts and the manufacturing cost.

It is yet a further object of the present invention to provide an improved truck bed design, which includes a reduced height between a top of the truck bed and the ground.

Finally, it is another object of the present invention to provide an improved truck bed design, which includes a reduced bridge clearance, lowered center of gravity and more convenient loading.

These and additional objects, advantages, features and benefits of the present invention will become apparent from the following specification.

BRIEF DESCRIPTION OF THE DRAWINGS

FIG. 5a is an enlarged cross sectional view of a portion of a front deck plate and a first rear deck plate of an improved truck bed design in accordance with the present invention.

FIG. 8 is a top view of a front pan of an improved truck bed design in accordance with the present invention.

FIG. 9 is a rear view of a front pan of an improved truck bed design in accordance with the present invention.

FIG. 10 is a cross sectional view of a front pan of an improved truck bed design in accordance with the present invention.

DETAILED DESCRIPTION OF THE PREFERRED EMBODIMENTS

Figure 1:
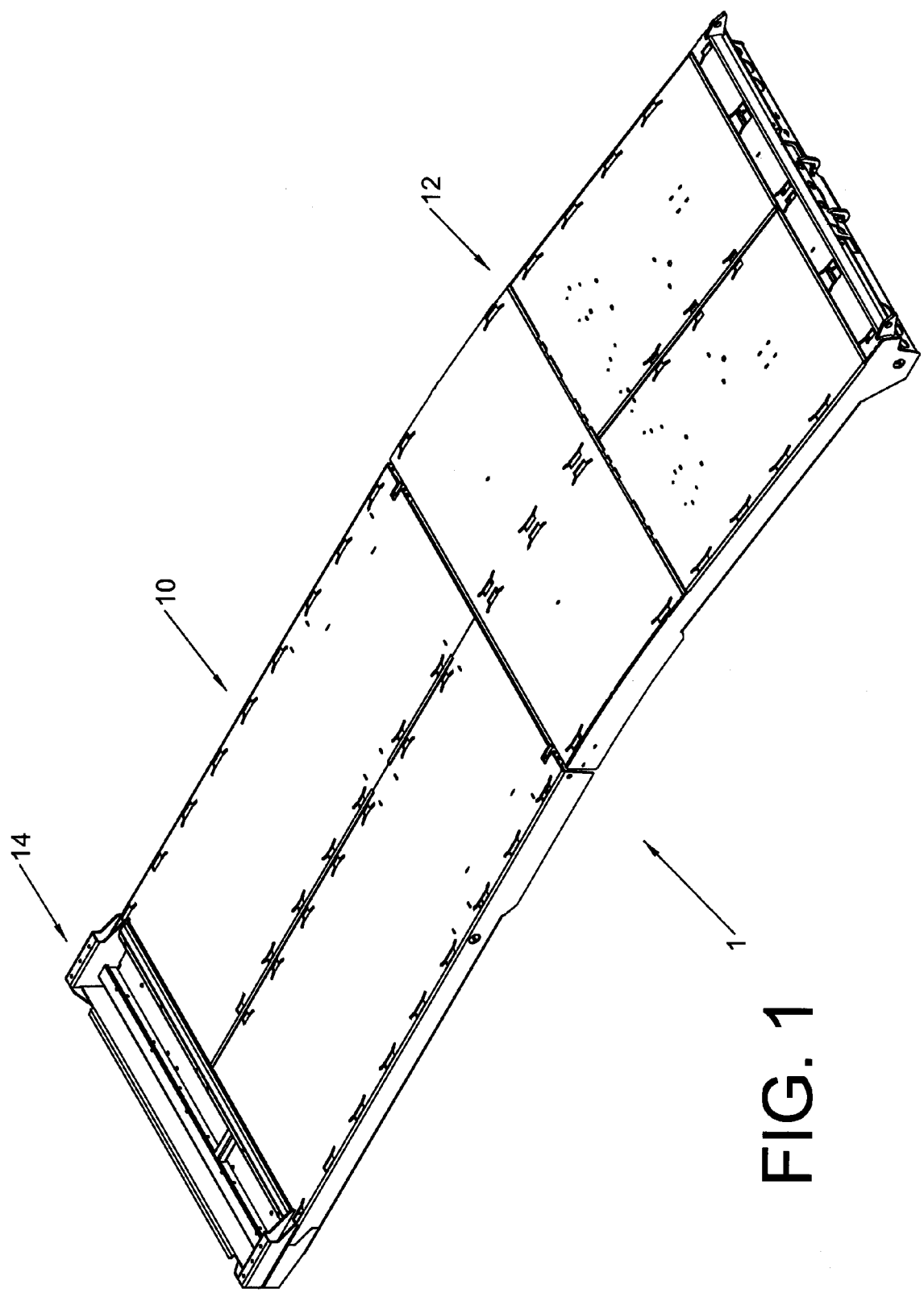
FIG. 1 is a perspective view of an improved truck bed design in accordance with the present invention.
Figure 2:
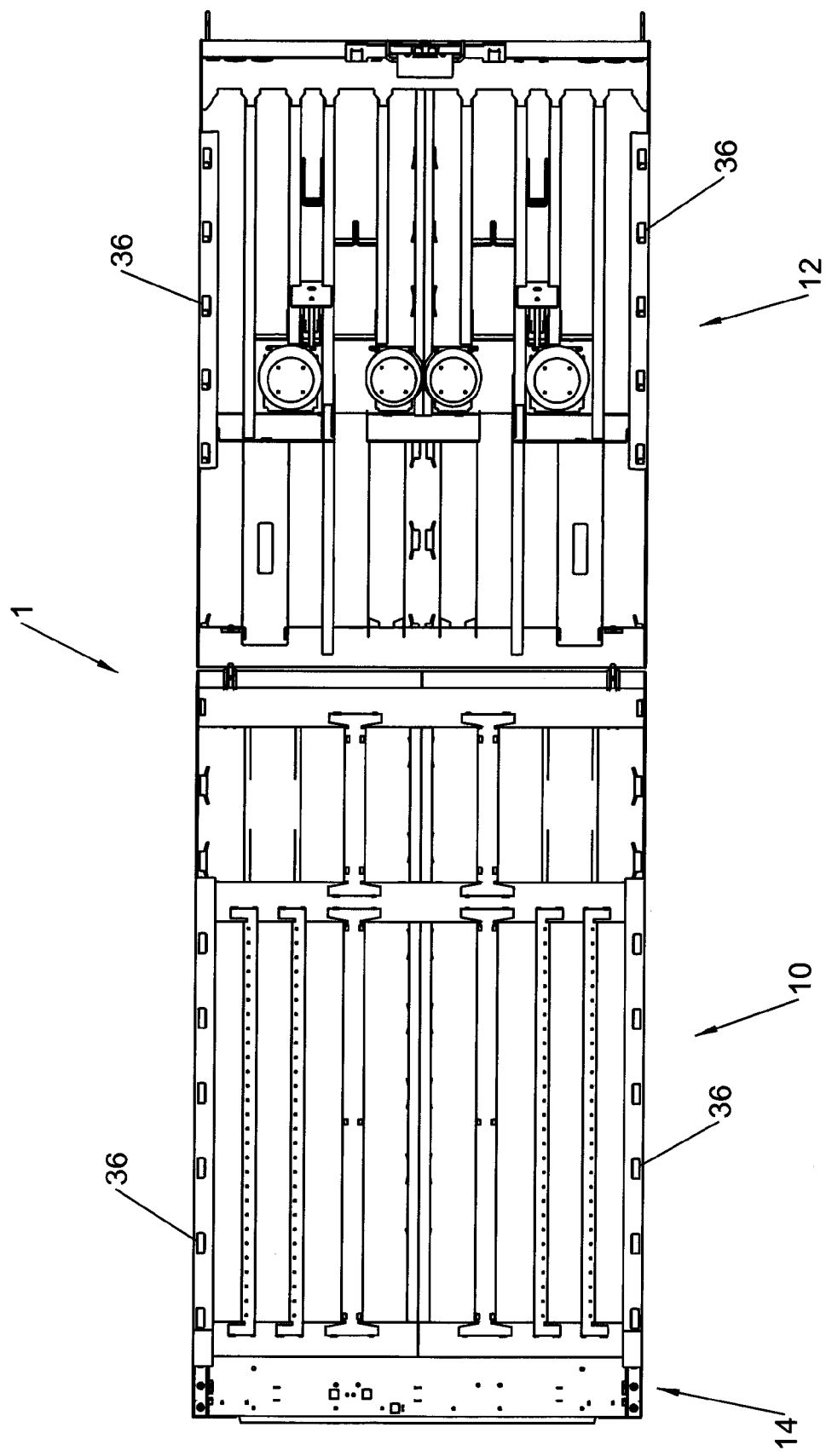
FIG. 2 is a bottom view of an improved truck bed design in accordance with the present invention.
Figure 3:
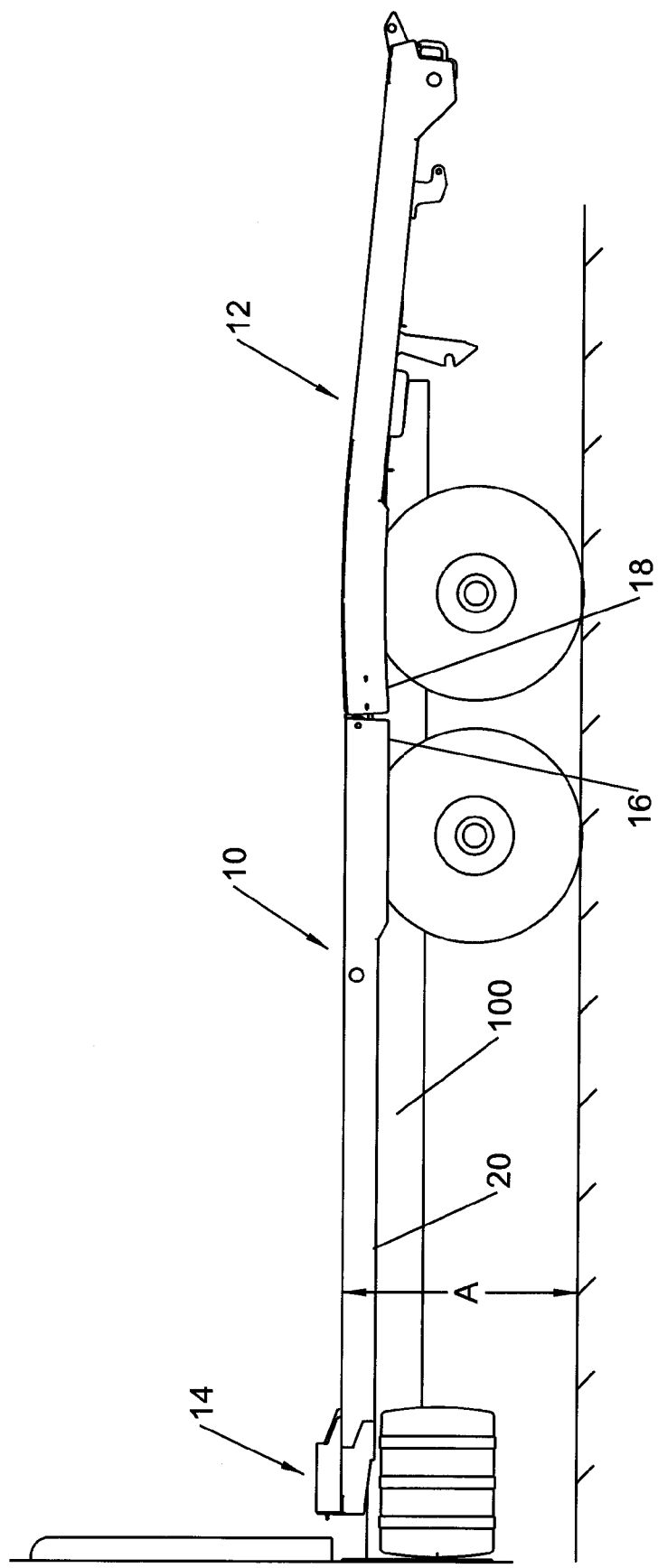
FIG. 3 is a side view of an improved truck bed design in accordance with the present invention.

With reference now to the drawings, and particularly to FIG. 1, there is shown a perspective view of an improved truck bed design 1. With reference to FIGS. 2-3, the improved truck bed design 1 preferably includes at least one front section 10, a rear section 12 and a front pan 14. A rear portion 16 of the front section 10 is preferably pivotally retained on a front portion 18 of the rear section 12. The front pan 14 is attached to a front portion 20 of the front section 10. The front section 10 preferably is secured to a bed frame 100.

Figure 4:
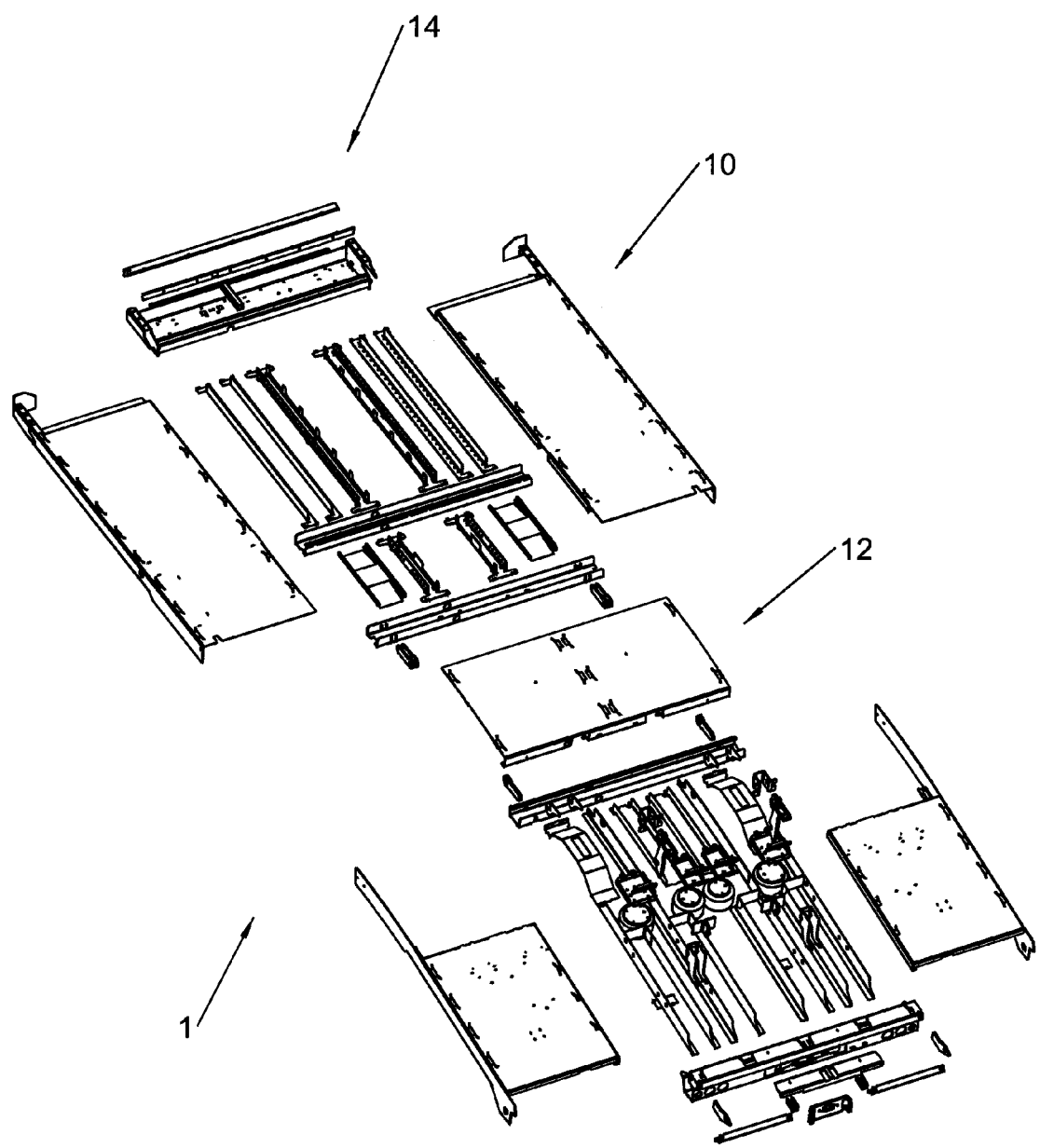
FIG. 4 is an exploded perspective view of an improved truck bed design in accordance with the present invention.
Figure 5:
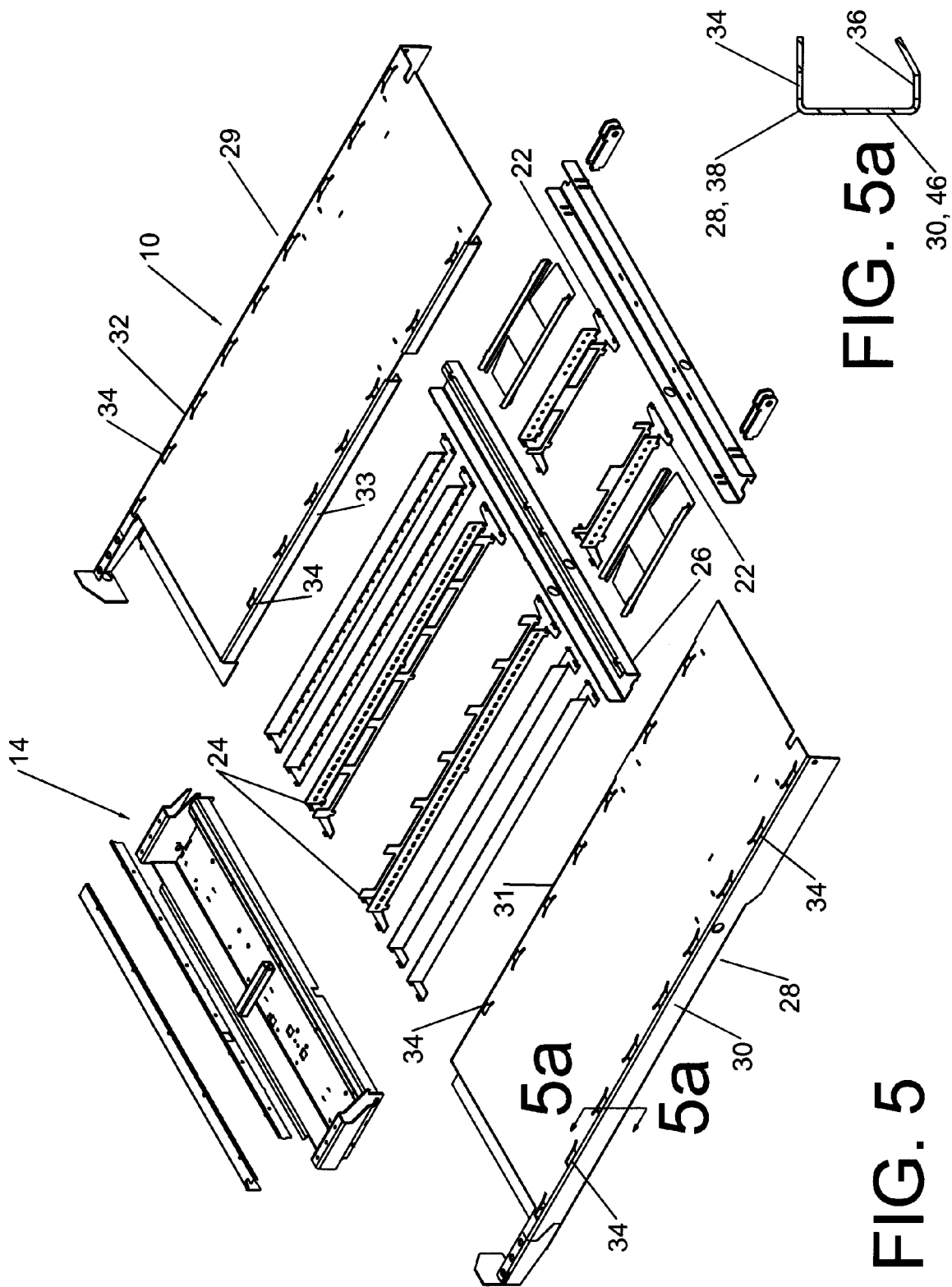
FIG. 5 is an exploded perspective view of a front pan and a front section of an improved truck bed design in accordance with the present invention.

With reference to FIGS. 4-5, the front section 10 preferably includes at least two first front lengthwise support members 22, at least two second front lengthwise support members 24, at least one cross member 26 and two front deck plates 28, 29. A height of the front lengthwise support members 22, 24 relative to that of the prior art is reduced by including the at least one cross member 26 and by increasing a thickness of the two deck plates 28, 29. The at least one cross member 26 preferably has a U-shaped cross section. The reduced height of the front lengthwise support members 22, 24 and the two thicker deck plates 28, 29 allow a top of the improved truck bed design 1 to be closer to the ground than that of the prior art front section. A distance from a top of the prior art truck bed to the ground is about 49 inches and a distance "A" from the top of the improved truck bed design 1 to the ground is about 44 inches.

With reference to FIG. 5a, the deck plates 28, 29 include outer side extensions 30, 32 and inner side extensions 31, 33. A portion of the outer and inner side extensions have a U-shape. The U-shape allows a plurality of tie-down openings 34 to be formed through a top of the deck plates 28, 29 and a plurality of lower tie-down openings 36 to be formed through a lower leg of the outer side extensions. The deck plate 28 and the outer and inner side extensions 30, 31 are formed from a single piece of material.

The deck plate 29 and the outer and inner side extensions 32, 33 are formed from a single piece of material. Ends of the front lengthwise support members 22, 24 are preferably welded to the at least one cross member and tops of the front lengthwise support members 22, 24 are welded to a bottom of the deck plates 28, 29.

Further, a thickness of the prior art deck plates is ¼ inch and a thickness of the two front deck plates 28, 29 is 5/16 inch. Increasing the thickness of the two front deck plates 28, 29 provides enough strength for the plurality of tie-down openings 34 to eliminate extra tie-down strengthening hardware. Eliminating the tie-down strengthening hardware reduces parts costs and eliminates man hours required to attach the strengthening hardware.

Figure 6:
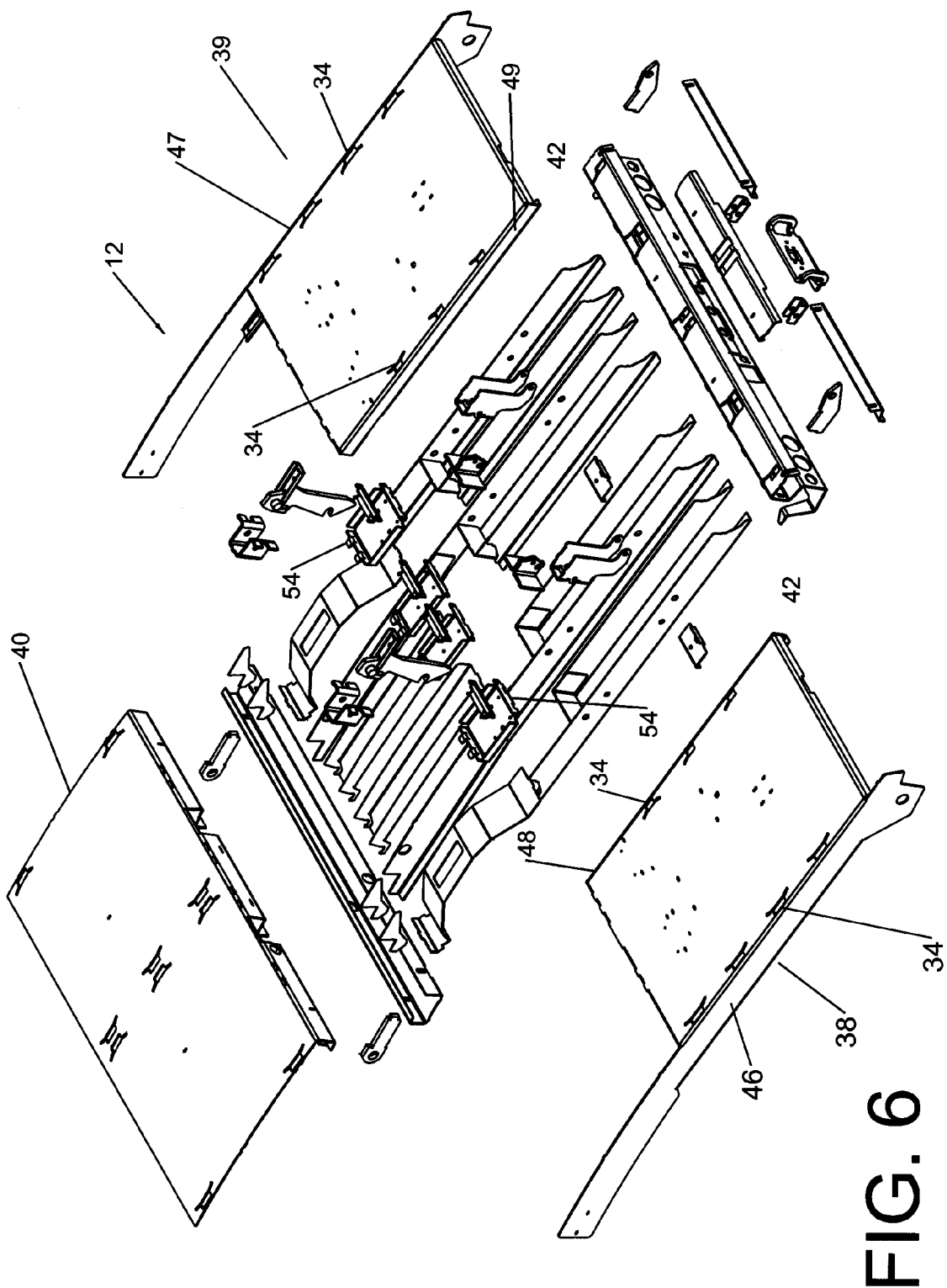
FIG. 6 is an exploded perspective view of a rear section of an improved truck bed design in accordance with the present invention.
Figure 7:
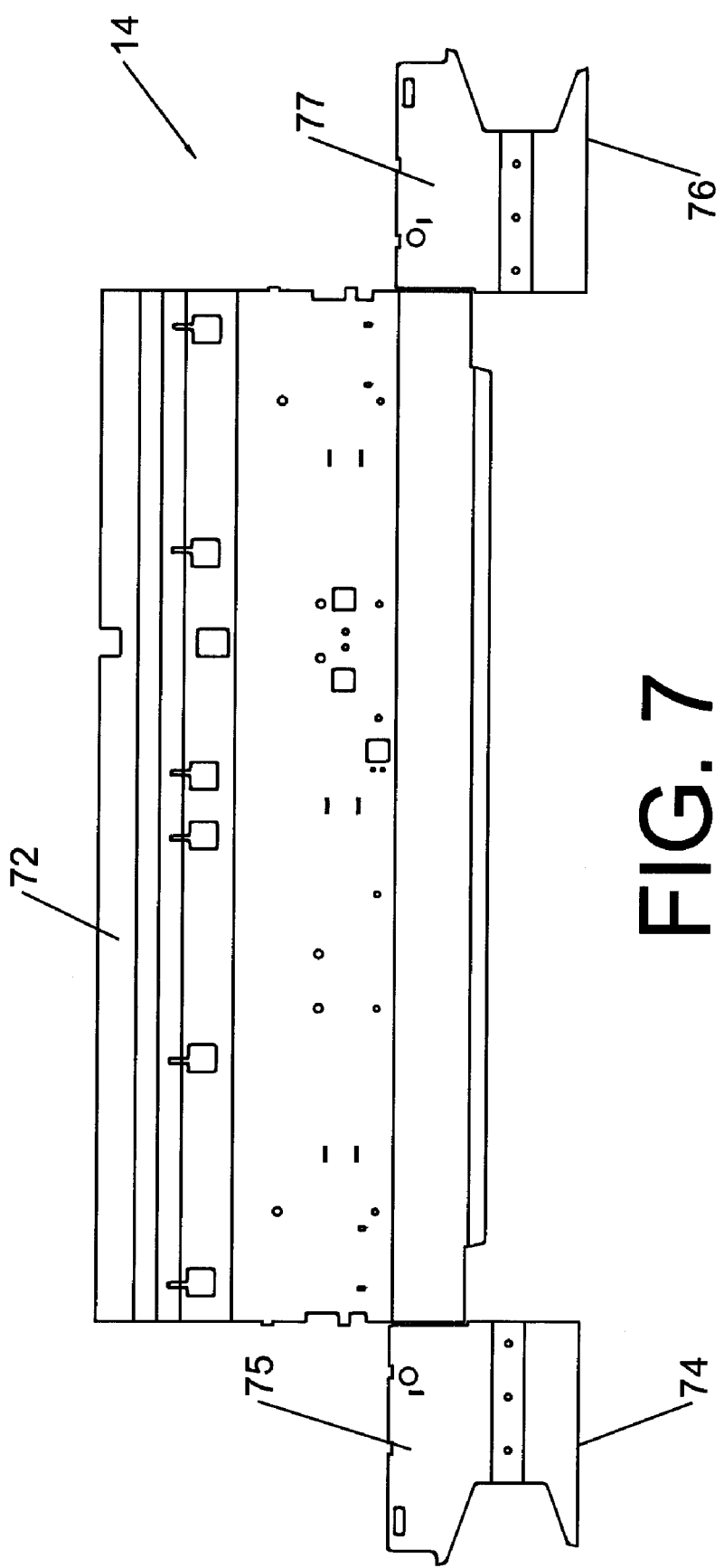
FIG. 7 is a top view of a front pan before forming of an improved truck bed design in accordance with the present invention.
Figure 11:
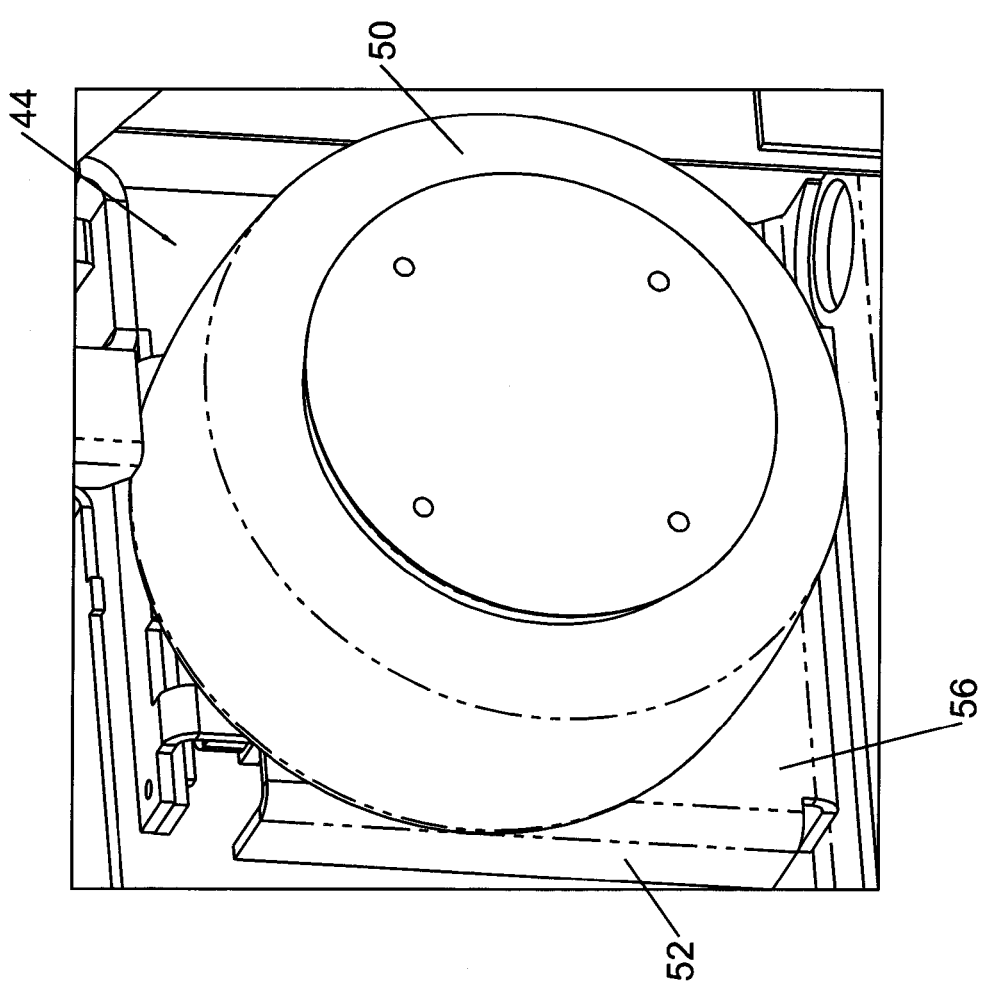
FIG. 11 is a perspective view of an improved air bag retention system of an improved truck bed design in accordance with the present invention.

With reference to FIGS. 6 and 11, the rear section 12 includes two first rear deck plates 38, 39, a second rear deck plate 40, a plurality of lengthwise support members 42 and at least two improved air bag retention systems 44. The first rear deck plates 38, 39 preferably include outer side extensions 46, 47 and inner side extensions 48, 49. With reference to FIG. 5a, a portion of the outer and inner side extension have a U-shape. The U-shape allows a plurality of tie-down openings 34 to be formed through a top of the deck plates 38, 39 and a plurality of lower tie-down openings 36 to be formed through a lower leg of the outer side extensions. The deck plate 38 and the outer and inner side extensions 46, 48 are formed from a single piece of material. The deck plate 39 and the outer and inner side extensions 47, 49 are formed from a single piece of material. Tops of the lengthwise support members 42 are welded to a bottom of the deck plates 38, 39.

Further, a thickness of the prior art first and second rear deck plates is ¼ inch and a thickness of the first and second rear deck plates 38, 39, 40 is 5/16 inch. Increasing the thickness of the first and second rear deck plates 38, 39, 40 provides enough strength for the plurality of tie-down openings 34 to eliminate extra tie-down strengthening hardware. Eliminating the tie-down strengthening hardware reduces parts costs and eliminates man hours required to attach the strengthening hardware.

Figure 12:
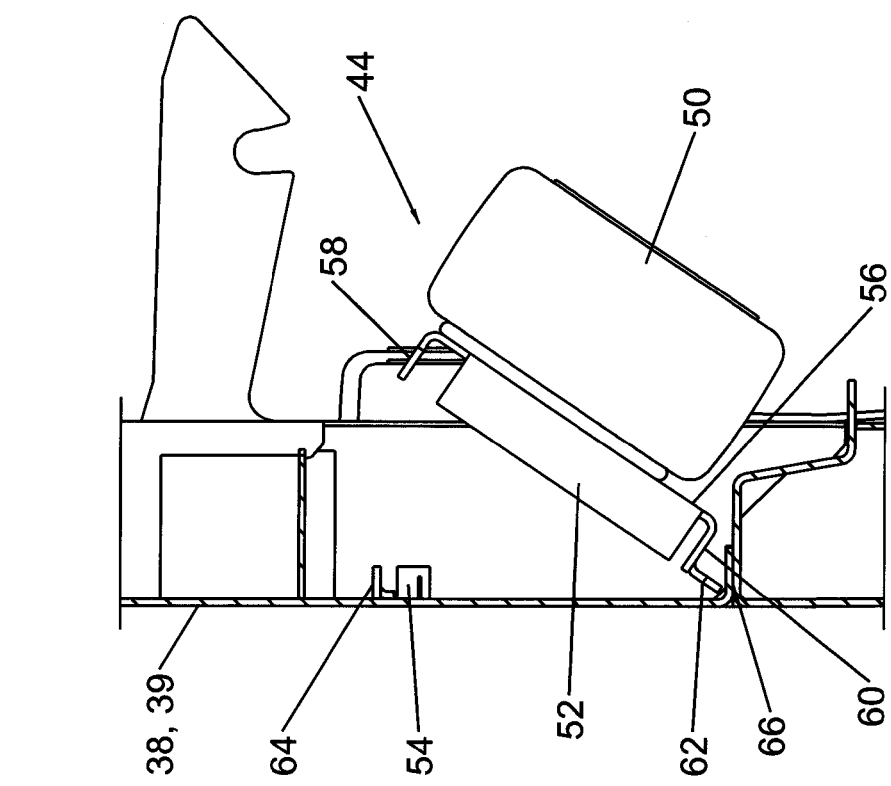
FIG. 12 is a side view of an improved air bag retention system before installation in a rear section of an improved truck bed design in accordance with the present invention.
Figure 14:
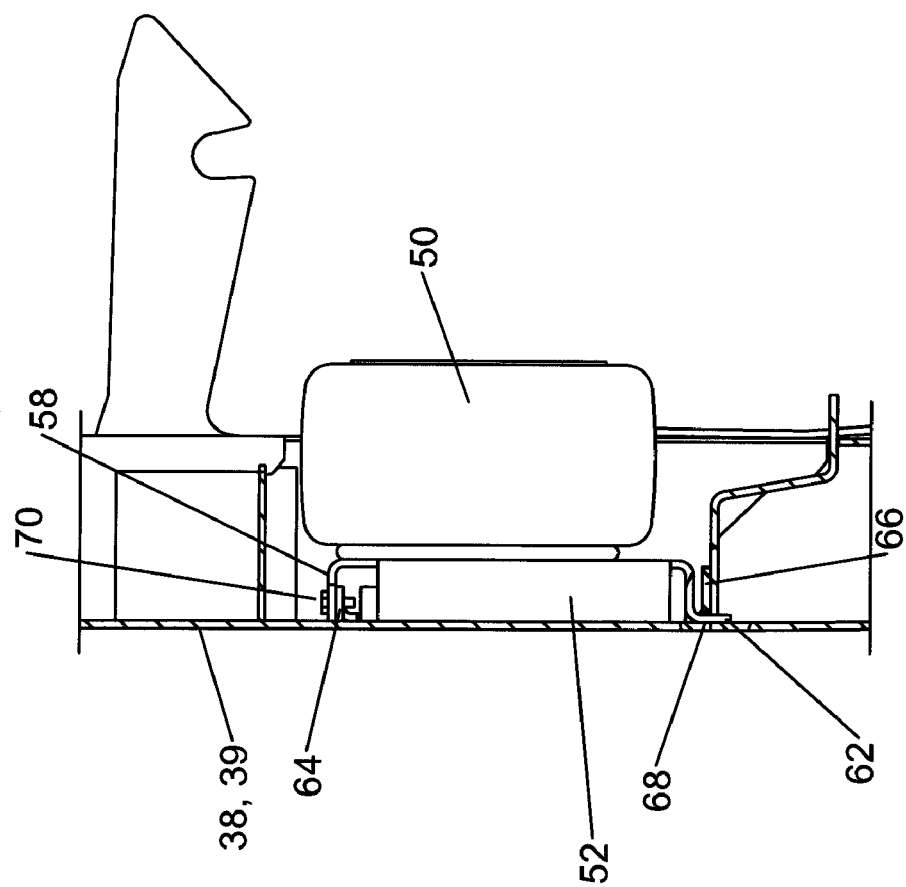
FIG. 14 is a side view of an improved air bag retention system installed in a rear section of an improved truck bed design in accordance with the present invention.
Figure 13:
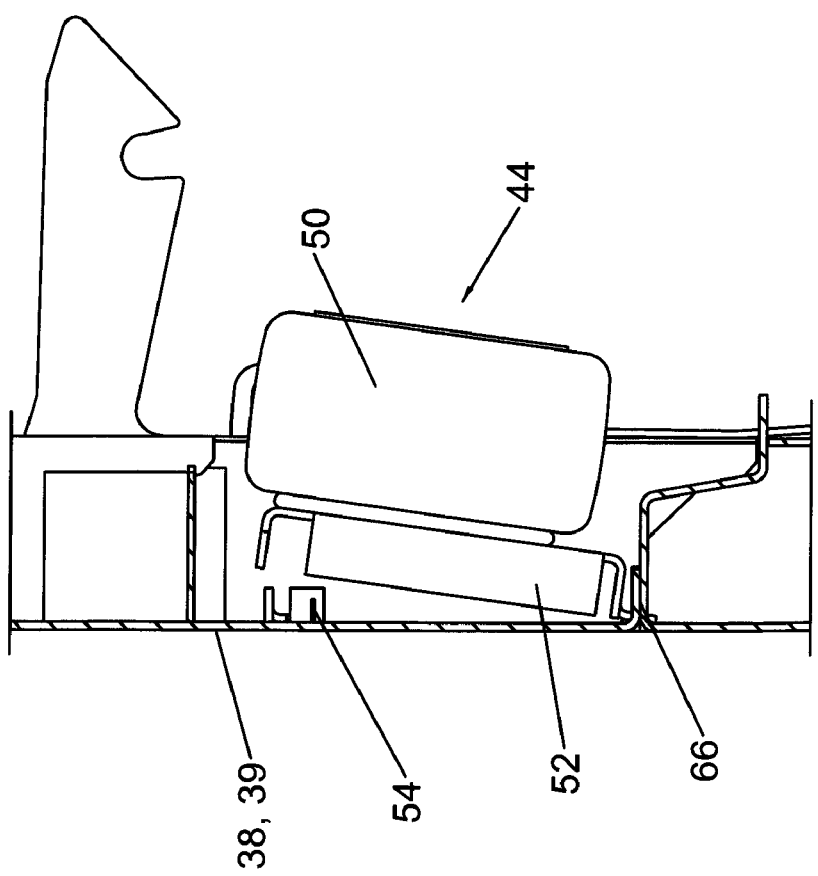
FIG. 13 is a side view of an improved air bag retention system partially installed in a rear section of an improved truck bed design in accordance with the present invention.

With reference to FIGS. 12-14, each improved air bag retention system 44 includes an air bag 50, an air bag bracket 52 and a base bracket 54. The air bag bracket 52 is preferably fabricated from a single piece of material. The air bag bracket 52 includes a base plate 56, a bolt flange 58 and a tongue flange 60. The tongue flange 60 preferably includes a pair of tongue projections 62 extending from the tongue flange 60. The base bracket 54 includes a base bolt flange 64. Each first rear deck plate 38, 39 includes a down-turned flange 66. A pair of tongue slots 68 are formed in the down-turned flange 66. The air bag 50 is attached to the air bag bracket 56. The base bracket 54 is attached to a bottom of the rear deck plate 38, 39. The pair of tongue projections 62 are inserted through the pair of tongue slots 68. At least two bolts 70 secure the bolt flange 58 to the base bolt flange 64.

With reference to FIGS. 5 and 7-10, the front pan 14 is fabricated from a single sheet of material. The front pan 14 includes a base member 72, a first side member 74 and a second side member 76. The first side member 74 extends from a first side of the base member 72 and the second side member 76 extends from a second side of the base member 72. A front end of the base member 72 is bent upward to form a front wall 78. A top of the front wall 78 is bent down to form a front flange 80. A rear end of the base member 72 is bent upward to form an inner rear wall 82, a rear top 84 surface and an outer rear wall 86. The inner rear wall extends upward from the base member 72. The rear top surface 84 extends from a top of the inner rear wall 82. The outer rear wall 86 extends downward from the rear top surface 84.

A first side member base portion 75 is bent upward against a first end of the front wall 78 and the front flange 80 to form a first inner wall 88. The first inner wall 88 is bent down to form a first top surface 90. The first top surface 90 is bent downward to form a first outer wall 92. A second side member 77 is bent upward against a second end of the front wall 78 and the front flange 80 to form a second inner wall 94. The second inner wall 94 is bent down to form a second top surface 96. The second top surface 96 is bent downward to form a second outer wall 98.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An improved truck bed comprising:
at least one front section, one of said at least one front section includes at least one front deck plate, a plurality of front lengthwise support members and a cross member, said cross member and said plurality of front lengthwise support members are attached to a bottom of said at least one front deck plate;
a rear section includes at least one rear deck plate and a plurality of rear lengthwise support members, said plurality of rear lengthwise support members are attached to a bottom of said at least one rear deck plate, at least two down-turned flanges extend from said at least one rear deck plate; and
at least two air bag retention systems are retained on a bottom of said rear section, each one of said at least two air bag retention system includes an air bag, an air bag bracket and a base bracket, said air bag is attached to said air bag bracket, said air bag bracket includes a bolt flange and at least one tongue projection, at least one tongue slot is formed in each one of said two down-turned flanges, said base bracket is attached to a bottom of said rear deck plate, said at least one tongue projection is inserted through said at least one tongue slot, at least one fastener is used to secure said bolt flange to said base bracket.

2. The improved truck bed of claim 1 wherein:
said at least one front deck plate includes a first front deck plate and a second front deck plate, an outer side extension is formed on said first and second front deck plates, an inner side extension is formed on said first and second front deck plates, a portion of said inner and outer side extensions have a U-shaped cross section.

3. The improved truck bed of claim 1 wherein:
said at least one rear deck plate includes a pair of first rear deck plates and a second rear deck plate, an outer side extension is formed on said pair of first rear deck plates, an inner side extension is formed on said pair of first rear deck plates, a portion of said inner and outer side extensions have a U-shaped cross section.

4. The improved truck bed of claim 1, further comprising:
a distance from a top of said improved truck bed to the ground is about 44 inches.

5. An improved truck bed comprising:
at least one front section, one of said at least one front section includes at least one front deck plate, a plurality of front lengthwise support members and a cross member, said cross member and said plurality of front lengthwise support members are attached to a bottom of said at least one front deck plate;
a rear section includes at least one rear deck plate and a plurality of rear lengthwise support members, said plurality of rear lengthwise support members are attached to a bottom of said at least one rear deck plate, at least two down-turned flanges extend from said at least one rear deck plate, a front of said rear section is pivotally secured to a rear of said front section; and
at least two air bag retention systems are retained on a bottom of said rear section, each one of said at least two air bag retention system includes an air bag, an air bag bracket and a base bracket, said air bag is attached to said air bag bracket, said air bag bracket includes a bolt flange and at least one tongue projection, at least one tongue slot is formed in each one of said two down-turned flanges, said base bracket is attached to a bottom of said rear deck plate, said at least one tongue projection is inserted through said at least one tongue slot, at least one fastener is used to secure said bolt flange to said base bracket.

6. The improved truck bed of claim 5 wherein:
said at least one front deck plate includes a first front deck plate and a second front deck plate, an outer side extension is formed on said first and second front deck plates, an inner side extension is formed on said first and second front deck plates, a portion of said inner and outer side extensions have a U-shaped cross section.

7. The improved truck bed of claim 5 wherein:
said at least one rear deck plate includes a pair of first rear deck plates and a second rear deck plate, an outer side extension is formed on said pair of first rear deck plates, an inner side extension is formed on said pair of first rear deck plates, a portion of said inner and outer side extensions have a U-shaped cross section.

8. The improved truck bed of claim 5, further comprising:
a distance from a top of said improved truck bed to the ground is about 44 inches.

9. An improved truck bed comprising:
at least one front section, one of said at least one front section includes at least one front deck plate, a plurality of front lengthwise support members and a cross member, said cross member and said plurality of front lengthwise support members are attached to a bottom of said at least one front deck plate, a front pan is attached to a front of said at least one front section;
a rear section includes at least one rear deck plate and a plurality of rear lengthwise support members, said plurality of rear lengthwise support members are attached to a bottom of said at least one rear deck plate, at least two down-turned flanges extend from said at least one rear deck plate; and
at least two air bag retention systems are retained on a bottom of said rear section, each one of said at least two air bag retention system includes an air bag, an air bag bracket and a base bracket, said air bag is attached to said air bag bracket, said air bag bracket includes a bolt flange and at least one tongue projection, at least one tongue slot is formed in each one of said two down-turned flanges, said base bracket is attached to a bottom of said rear deck plate, said at least one tongue projection is inserted through said at least one tongue slot, at least one fastener is used to secure said bolt flange to said base bracket.

10. The improved truck bed of claim 9 wherein:
said at least one front deck plate includes a first front deck plate and a second front deck plate, an outer side extension is formed on said first and second front deck plates, an inner side extension is formed on said first and second front deck plates, a portion of said inner and outer side extensions have a U-shaped cross section.

11. The improved truck bed of claim 9 wherein:
said at least one rear deck plate includes a pair of first rear deck plates and a second rear deck plate, an outer side extension is formed on said pair of first rear deck plates, an inner side extension is formed on said pair of first rear deck plates, a portion of said inner and outer side extensions have a U-shaped cross section.

12. The improved truck bed of claim 5, further comprising:
a distance from a top of said improved truck bed to the ground is about 44 inches.

* * * * *